Figure 1:
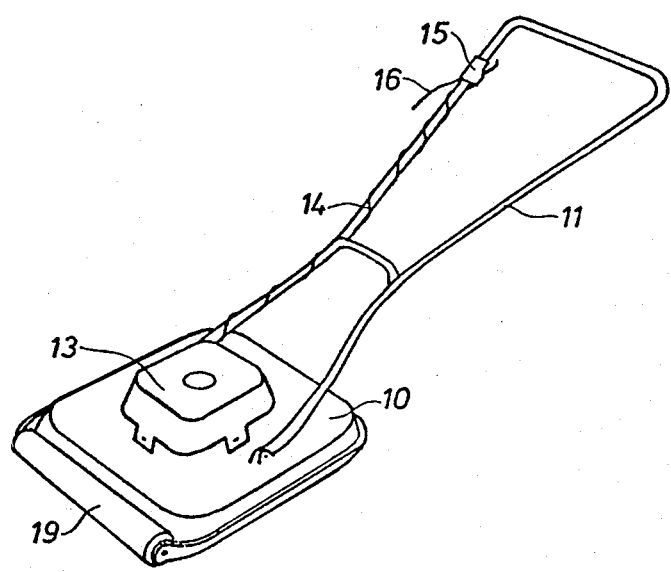

United States Patent [19]

Dunn

[11] Patent Number: 4,510,738
[45] Date of Patent: Apr. 16, 1985

[54] AIR CUSHION LAWN MOWER

[76] Inventor: Kenneth Dunn, 70 Fulthorpe Ave., Mowden Park, Darlington, Co. Durham, England

[21] Appl. No.: 41,533

[22] Filed: May 22, 1979

[30] Foreign Application Priority Data

May 22, 1978 [GB] United Kingdom ............ 21042

[51] Int. Cl.³ .................................. A01D 46/00
[52] U.S. Cl. .................................. 56/12.8; 56/249
[58] Field of Search ........................ 56/12.8, 249

[56] References Cited

U.S. PATENT DOCUMENTS

| 456,472 | 7/1891 | Braun et al. | 56/249 |
| 901,449 | 10/1908 | Husted | 256/51 |
| 1,632,231 | 6/1932 | Holtz | 256/23 |
| 1,939,841 | 12/1933 | Briggs | 273/29 BB |
| 2,574,725 | 11/1951 | Berdan | 56/249 |
| 3,118,268 | 1/1964 | Benz | 56/249 |
| 3,338,038 | 8/1967 | Camph | 56/12.8 |
| 3,423,912 | 1/1969 | Heth | 56/12.8 |
| 3,838,558 | 10/1974 | Goodchild | 56/12.8 |
| 4,236,698 | 12/1980 | Compte | 256/23 |

FOREIGN PATENT DOCUMENTS

| 224671 | 11/1924 | United Kingdom | 256/35 |
| 321719 | 8/1928 | United Kingdom | 56/12.8 |

Primary Examiner—Robert A. Hafer

[57] ABSTRACT

An air-cushion lawn mower has a rotary cutting blade shrouded by a hood. The mower has a fan wheel rotatable about the same axis as the blade, and both the blade and the fan wheel are driven by a motor mounted on the hood. The front part of the hood with respect to the normal direction of travel of the mower, has projections which support a freely rotatable roller which acts to reduce the frictional resistance to forward motion when the mower is used to cut relatively long blades of grass.

6 Claims, 2 Drawing Figures

AIR CUSHION LAWN MOWER

BACKGROUND OF THE INVENTION

This invention relates to a lawn mower of the type which in operation is supported on a cushion of air and comprises a blade which is rotated about a vertical axis by a driving unit, and a fan wheel rotating about the same axis, the blade and fan wheel being shrouded by a hood having one or several inlet openings for air to the air cushion.

Lawn mowers of this type are previously known, for instance by British Pat. No. 929,610. Due to the fact that this type of lawn mower has no wheels but floats on a cushion of air it has the advantage that it can be easily moved over a lawn. The only resistance it has to overcome is that which is created by the friction of un-cut grass straws against the lower front part of the hood.

However, this resistance can be considerable when cutting tall and heavy grass. The object of this invention is to reduce this resistance and make the mower relatively easy to handle.

SUMMARY OF THE INVENTION

According to this invention an air cushion lawn mower comprises: a housing forming an air cushion hood; a grass cutting blade shrouded by the housing and rotatable about a generally vertical axis; a fan wheel rotatable about said axis for generating an air cushion beneath the hood; a drive unit coupled to the blade and the fan; and at least one roller mounted on one edge of the housing, which edge constitutes the front edge of the housing when the mower is propelled in its normal direction of travel.

In a conventional non-hovering type of mower horizontal rollers are often used to support part of the weight of the mower and to provide a smooth ride over uneven surfaces. In an air-cushion mower in accordance with this invention the function of the roller or rollers is instead to bend longer blades of grass, with relatively little resistance, towards the ground before they are reached by the front edge or rim of the hood, thus considerably easing forward progress of the mower.

Figure 2:
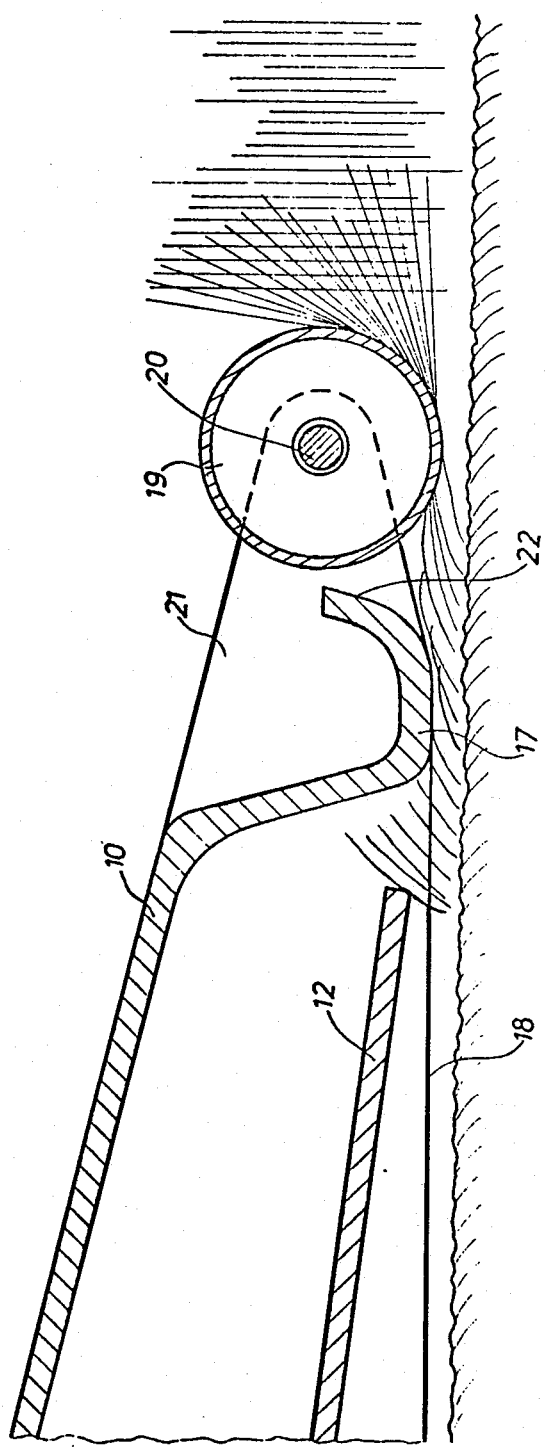

The invention will now be described by way of example with reference to the accompanying drawings, in which FIG. 1 is a perspective view of a lawn mower in accordance with the invention and FIG. 2 is a vertical section to a larger scale through the device.

As can be seen in FIG. 1, the lawn mower has a hood 10 and a handle 11 pivotally supported on the hood. The hood shrouds a fan wheel, not shown, which together with a blade 12 is fastened to the lower part of a vertical driving shaft. The driving unit is placed on the hood 10 and is surrounded by a cover 13. The driving unit indicated in FIG. 1 is an electric motor which via a cable 14 is connected to a switch 15 on the handle 11. The switch 15 is via a long cable 16 connected to a current source. Instead of using an electric motor it is of course possible to use an internal combustion engine.

The hood 10 has an outer peripheral rim 17, which completely surrounds the hood and the lower part of which is situated in a horizontal plane 18. The object of the rim 17 is to limit the air cushion which is built up under the hood. In the front part of the hood and in front of the rim 17 is a roller 19. This roller is freely rotatable on a shaft 20 extending transversely to the direction of operation. The roller 19 has such a diameter and is placed so that its periphery lies above the horizontal plane 18. Thus it has no influence on the normal hovering of the mower.

The shaft 20 is supported at its end by two arms 21 extending forwards from the hood. By using a roller 19 in front of the mower the sliding friction of the grass, which would normally be taken up by the surface 22 of the rim 17, is transmitted to the roller as rolling friction thus reducing the resistance and improving the handling of the mower when being hand-pushed into heavy tall grass. It should be pointed out that it is desirable to use a roller which is light and has a radius as large as possible with respect to the radius of the shaft, because this will promote converting of sliding friction into rolling friction.

It is of course possible to use several rollers instead of a single roller in the front part of the mower.

The invention is not limited to the embodiment shown but can be modified within the scope of the following claims.

What is claimed is:

1. An air cushion lawn mower comprising:
   a housing forming an air cushion hood;
   a grass cutting blade shrouded by the housing and rotatable about a generally vertical axis;
   a fan wheel rotatable about said axis for generating an air cushion beneath the hood;
   a drive unit coupled to the blade and fan;
   a non-weight bearing roller mounted on the housing adjacent one edge thereof and freely rotatable about an axis extending transversely to the normal direction of travel, which edge constitutes the front edge of the housing when the motor is propelled in its normal direction of travel, and said housing is provided with a peripheral lower rim which lies generally in a horizontal plane and has an upstanding lip, and wherein said roller axis is situated above said plane.

2. An air cushion lawn mower as defined in claim 1 wherein the axis is situated ahead of the forward extremity of the housing.

3. An air cushion lawn mower as defined in claim 1 wherein said roller is freely rotatable about a shaft extending transversely to the normal direction of travel, and said roller has a length which is substantially the same as as the width of said mower housing.

4. An air cushion lawn mower as defined in claim 1 wherein said roller is rotatable about a horizontal axis and the lower extremity of the or each roller which substantially coincides with said plane.

5. An air cushion lawn mower as defined in claim 3 wherein the shaft is supported by two outer arms attached to or forming part of the housing and extending forwardly relative to the said front edge.

6. An air cushion lawn mower as defined in claim 1 wherein said roller is mounted outside the air cushion hood.

* * * * *